United States Patent
Sworski et al.

(10) Patent No.: US 11,017,483 B2
(45) Date of Patent: *May 25, 2021

(54) SYSTEM AND METHOD FOR TELEMATICS FOR TRACKING EQUIPMENT USAGE

(71) Applicant: Valvoline Licensing and Intellectual Property, LLC, Lexington, KY (US)

(72) Inventors: Adam E. Sworski, Catlettsburg, KY (US); Frances E. Lockwood, Georgetown, KY (US); Roger D. England, Lexington, KY (US); Timothy L. Caudill, Catlettsburg, KY (US); Jeffrey S. Baker, Lexington, KY (US); Jeffrey R. Torkelson, Lexington, KY (US)

(73) Assignee: Valvoline Licensing and Intellectual Property, LLC, Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,423

(22) Filed: Mar. 3, 2020

(65) Prior Publication Data

US 2020/0202453 A1 Jun. 25, 2020

Related U.S. Application Data

(63) Continuation-in-part of application No. 16/114,503, filed on Aug. 28, 2018, now Pat. No. 10,623,905.

(51) Int. Cl.
*G06Q 40/00* (2012.01)
*G06Q 50/06* (2012.01)
(Continued)

(52) U.S. Cl.
CPC ......... *G06Q 40/123* (2013.12); *G06Q 20/085* (2013.01); *G06Q 50/06* (2013.01);
(Continued)

(58) Field of Classification Search
CPC ...... G06Q 40/123; G06Q 50/06; G06Q 50/30; G06Q 20/085; G06Q 50/265;
(Continued)

(56) References Cited

U.S. PATENT DOCUMENTS 7,865,391 B2 1/2011 Martinez-Olague et al.
8,054,048 B2 11/2011 Woody et al.
(Continued)

OTHER PUBLICATIONS

MyOReGO, A New Way to Fund Roads for all Oregonians, launched in Jul. 2015, downloaded at http://www.myorego.org on Feb. 19, 2019 (7 pages).
(Continued)

*Primary Examiner* — Inder P Mehra
(74) *Attorney, Agent, or Firm* — Benesch, Friedlander, Coplan & Aronoff LLP (57) ABSTRACT

Systems and methods are described for tracking information of an equipment including a telematics device configured to receive data from the equipment to determine a telematics information. The telematics information includes at least two of an equipment type, a location, a duration in the location, and miles travelled. A transmission device is configured to transmit the vehicle telematics information to at least one of a third party entity device, a government device and a mobile device.

18 Claims, 5 Drawing Sheets

(51) Int. Cl.
*G06Q 50/30* (2012.01)
*G06Q 20/08* (2012.01)
*H04W 4/021* (2018.01)
*H04W 4/44* (2018.01)
*H04W 4/38* (2018.01)
*G07C 5/00* (2006.01)
*G06Q 50/26* (2012.01)
*G05D 1/00* (2006.01)

(52) U.S. Cl.
CPC ........... *G06Q 50/265* (2013.01); *G06Q 50/30* (2013.01); *G07C 5/008* (2013.01); *H04W 4/021* (2013.01); *G05D 1/0088* (2013.01); *G06Q 2240/00* (2013.01); *H04W 4/44* (2018.02)

(58) Field of Classification Search
CPC ... G06Q 2240/00; G07C 5/008; H04W 4/021; H04W 4/44; H04W 4/38; G05D 1/0088
USPC ...................................................... 455/456.3
See application file for complete search history.

(56) References Cited

U.S. PATENT DOCUMENTS

| | | |
|---|---|---|
| 8,433,471 B2 | 4/2013 | Christensen et al. |
| 8,538,621 B2 | 9/2013 | Ross et al. |
| 8,577,528 B2 | 11/2013 | Uyeki |
| 8,610,401 B2 | 12/2013 | Kim et al. |
| 8,718,844 B2 | 5/2014 | Krause et al. |
| 8,941,463 B2 | 1/2015 | Rovik et al. |
| 9,037,507 B2 | 5/2015 | Tate, Jr. |
| 9,137,364 B2 | 9/2015 | Gullapalli et al. |
| 9,174,548 B2 | 11/2015 | Nakagawa et al. |
| 9,176,680 B2 | 11/2015 | Chen et al. |
| 9,406,033 B2 | 8/2016 | Dempski |
| 9,796,286 B2 | 10/2017 | Atluri et al. |
| 9,821,677 B2 | 11/2017 | Kim |
| 2011/0106336 A1 | 5/2011 | Alevo |
| 2011/0153367 A1 | 6/2011 | Amigo |
| 2013/0031029 A1 | 1/2013 | Davidson |
| 2013/0096995 A1 | 4/2013 | Rosalik, Jr. |
| 2014/0164196 A1 | 6/2014 | Reddy et al. |
| 2014/0195140 A1* | 7/2014 | Twarog .................. G06F 17/00 701/123 |
| 2014/0337253 A1 | 11/2014 | Berezin et al. |
| 2014/0358749 A1 | 12/2014 | Williams et al. |
| 2015/0140953 A1* | 5/2015 | Bull ....................... H04W 4/029 455/404.2 |
| 2015/0233718 A1* | 8/2015 | Grokop ................. G06Q 40/08 701/501 |
| 2015/0242969 A1* | 8/2015 | Pallas ..................... G06Q 50/06 705/39 |
| 2016/0282514 A1* | 9/2016 | Moran .................... G01W 1/02 |
| 2016/0375783 A1 | 12/2016 | Uyeki et al. |
| 2017/0053456 A1 | 2/2017 | Cho et al. |
| 2017/0323244 A1 | 11/2017 | Rani et al. |
| 2017/0365169 A1* | 12/2017 | Tennent ............... G08G 1/0145 |
| 2018/0009325 A1 | 1/2018 | Jang et al. |
| 2018/0011483 A1 | 1/2018 | Ricci |
| 2018/0137494 A1* | 5/2018 | Matsukura ......... G06Q 30/0208 |
| 2018/0150776 A1 | 5/2018 | Anagnos et al. |
| 2018/0328794 A1* | 11/2018 | Hoff ....................... G01K 13/00 |
| 2018/0350162 A1* | 12/2018 | Davidson ......... G06Q 10/06395 |
| 2019/0019362 A1* | 1/2019 | Gravelle ............... G07B 15/063 |
| 2019/0051179 A1 | 2/2019 | Alvarez et al. |
| 2019/0287162 A1 | 9/2019 | Ismail et al. |

OTHER PUBLICATIONS

Lockwood, Bill, "Using Fleet Telematics to Reduce Fuel Tax Reporting," www.multibriefs.com, Aug. 2, 2018, 2 pages.
Shepard, Dayton, "Telematics: The Growing Trend," www.lee-smith.com, Jul. 12, 2017, 7 pages.
Geotab, "3 Powerful Examples of Telematics System Integration for Truck Fleets," www.geotab.com, Oct. 23, 2017, 7 pages.
Zonar, "Telematics Technology Fuels Larger Reimbursements," www.forconstructionpros.com, Oct. 7, 2014, 3 pages.
Palmer, Yukon, "Fleet GPS Tracking Systems Help Automate IFTA Fuel Tax Calculations," http://fieldlogix.com, Aug. 5, 2010, 5 pages.
Non-Final Office Action filed in US Appl. No. 16/795,187 dated Aug. 5, 2020.
Final Office Action dated Feb. 23, 2021 for U.S. Appl. No. 16/795,187, 36 pages.

* cited by examiner

SYSTEM AND METHOD FOR TELEMATICS FOR TRACKING EQUIPMENT USAGE

CROSS-REFERENCE TO RELATED APPLICATIONS

This Application is a Continuation-In-Part Application of U.S. patent application Ser. No. 16/114,503, titled "System And Method For Telematics For Tracking Equipment Usage," filed on Aug. 28, 2018, which is incorporated by reference herein in its entirety.

TECHNICAL FIELD

This disclosure relates to telematics, and to systems that track and charge for equipment use.

BACKGROUND

Telematics is an interdisciplinary field that may encompass telecommunications, vehicular technologies, road transportation, road safety, electrical engineering, e.g., sensors, instrumentation, wireless communications, etc., and/or computer science, e.g., multimedia, Internet, etc.

DETAILED DESCRIPTION

A telematics system efficiently receives and processes information, e.g., to charge usage and/or tax the equipment. A tax may be a financial contribution in support of the government or a fee or charge levied to meet an expense. In some examples, information may include or may be based on miles travelled, energy consumed, rates of consumption, location information, types of equipment used, power charging details, etc., that may be tracked and processed by vehicle technologies and a telematics system. The tracked and processed information may be used to efficiently determine usage charges and/or pay transport taxes on various types of vehicles, e.g., such as rental vehicles, lease vehicles, drones, off road vehicles, etc., e.g., based on local, municipal, state and/or federal regulations, etc., and/or company/organization fee assessments, etc., and for flying cars, a flight tax may be levied per trip and based on amount of fuel consumed and distance flown.

Figure 1:
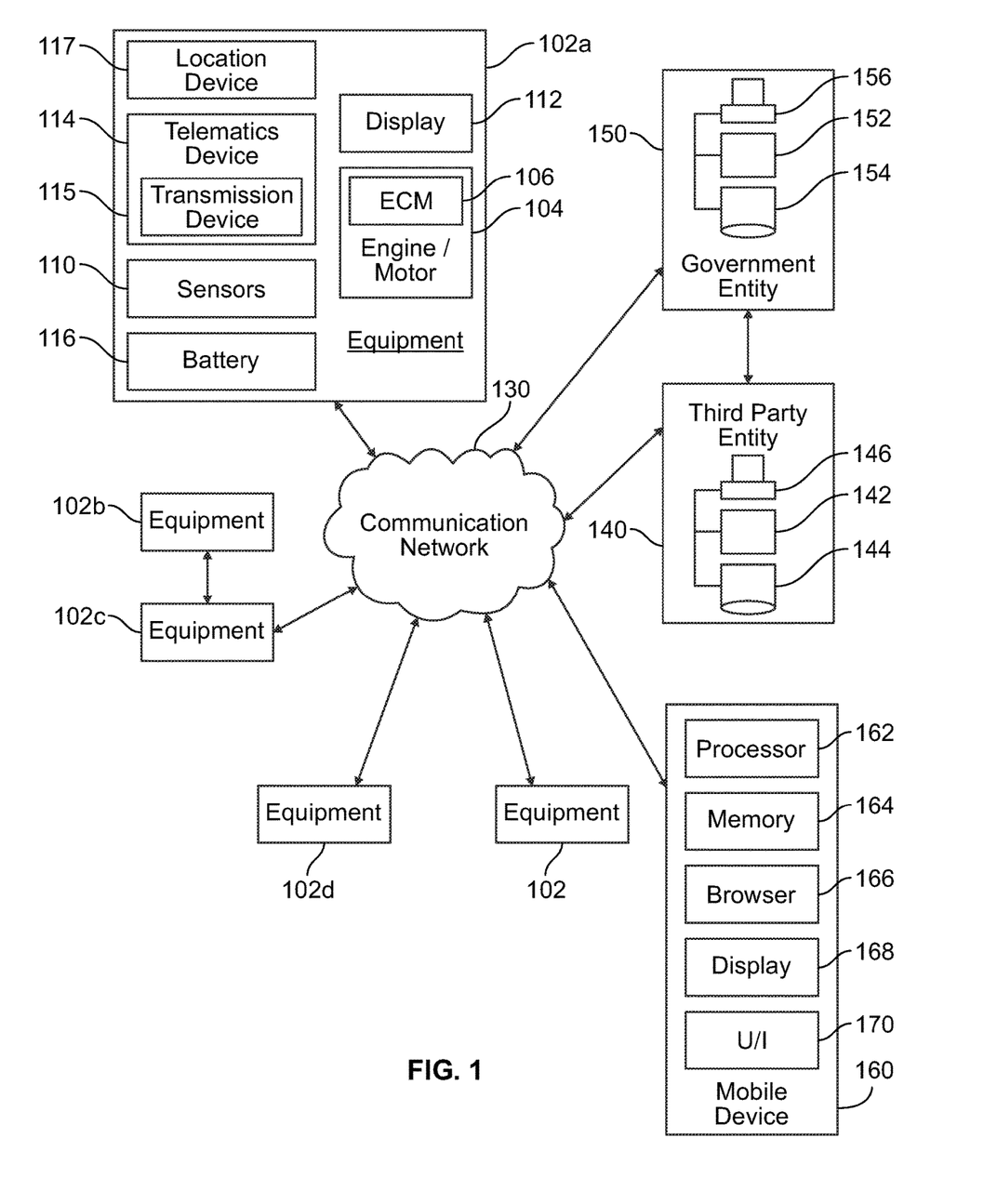
FIG. 1 is a block diagram of an example environment for tracking information related to taxing vehicle use.

FIG. 1 is a block diagram of an exemplary environment 100 for tracking information related to equipment usage, e.g., for charging or taxing equipment 102$a$-$n$. Equipment include structures for transporting persons or things, such as vehicles, (e.g., rental vehicles, leased vehicles, fleet managed vehicles, hybrid vehicles, partial or fully autonomous vehicles, flying cars, trucks, cars, buses, etc.) recreational vehicles, (ATV's, off-road vehicles, drones, boats, etc.), and/or industrial or home equipment (such as power generators, mining equipment, agriculture equipment, construction equipment, etc.). The equipment 102$a$-$n$ may be powered by machines that convert energy into mechanical force or motion such as one or more engines and/or motors 104, e.g., internal combustion engines and/or electric motors. The equipment 102$a$-$n$ may include an electronic control unit (ECU) 106 in communication with the engine/motor 104. The ECU 106 may send control information to the engine/motor 104 and receive feedback from the engine/motor 104 and/or other parts of the equipment 102$a$-$n$. The ECU 106 may also communicate with one or more sensors 110, one or more displays 112, including audible and/or visual displays, a telematics device 114, batteries 116 and a location device 117, etc. The location device 117 may include a global positioning system (GPS) device, including one or more of satellite-based positioning systems, cellular based positioning systems, etc. In some systems, the location device 117 is incorporated into the telematics device 114.

Some telematics devices 114 include, and/or are connected or coupled with, a transmission device 115, that provides a communication link between the equipment 102$a$-$n$ and a communication network/environment 130 and/or other equipment 102$a$-$n$. The communication network 130 may connect the telematics device 114 to one or more of third party entity devices 140, government entity devices 150, user devices 160, etc., Other types of communication networks/environments include, but are not limited to, vehicle to vehicle (V2V) architectures and/or vehicle to infrastructure (V2I) communications. The communication network/environment 130 may include wireless and/or wired or physical communication mediums, including but not limited to, cellular communications, satellite communications, WiFi, Bluetooth, Ethernet, etc. The third party entity devices 140 may include one or more servers 142, memory 144 and computers 146. The servers 142 and/or the memory 144 may be located locally on-site and/or distributed remotely from offices of the electric vehicle infrastructure companies 140. They may be located in a remote computing environment, for example, and may comprise distributed independent servers coupled together that operate and appear to clients as a single unit. The systems improve network capacity, by among other things, enabling servers to shift work and/or balance loads. The systems enhance network stability and minimize downtime caused by application or system failures.

In some systems, a third party entity may comprise a private or public cloud environment. The government entities 150 may include one or more servers 152, memory 154 and computers 156. The servers 152 and/or the memory 154 may be located locally on-site and/or distributed remotely from offices of the government entities 150, e.g., located in a remote computing environment, for example, or within a private or public cloud environment. The user device 160 may include one or more mobile a processor 162, a memory 164, a browser 166, a display 168 and a user interface (U/I) 170. In some examples, the user device 160 comprises a mobile device, that may be smart phones, tablets, personal digital assistants, etc. In other use cases, the user device 160 comprises a personal computer.

The telematics device 114 may collect information from one or more of the ECU 106, sensors 110, battery 116, location device 117, etc. of the equipment 102a-n. The collected information may include data representing road conditions (via images or vehicle data such as acceleration data), distanced traveled, miles travelled, location, miles/time within a predesignated area such as a geo-fenced area, energy usage, the physical size of the equipment 102a-n, etc. Additionally or alternatively, the collected information may be processed by one or more of the telematics devices 114, the third party entity devices 140, government entity devices 150, the mobile devices 160, etc., to determine one or more of, miles travelled, location, miles or time within geo-fenced area, energy usage, size of the equipment 102a-n, etc. Energy usage may be measured in the amounts or rates of use consumed or delivered to a consuming device. Energy use may monitor hydrogen in Liters or Kg or at flow rate of L/min or an equivalent, electric use, natural gas use in $ft^3$ or at a flow rate of $ft^3$/hr or an equivalent, or monitor electric charge delivered or returned to a source (e.g., the utility) diesel fuel, solar, gasoline, etc. In some examples, e.g., for vehicle type equipment (e.g., such as battery's capacity described in A/hr), the miles travelled may be linked to the geo-fenced areas and reported for direct charging or taxation. In some example, the size of vehicle, battery capacity, etc. may be processed to determine tax assessments. In some systems, taxes (e.g., contributions in support of a government entity) and may include state, federal, and/or municipality taxes, or other entities e.g., depending on the needs of organizations and/or geographic concerns.

In some systems, the telematics information is processed to determine and report road conditions. The telematics information may be based on acceleration data, for example, on-board sensors, and/or other data captured via a road inspection system that captures images and pictures, that may measure, brightness (via comparisons of feature points), rutting, depth, flatness, etc. Road conditions may be rendered by combining and comparing images based on brightness and based on a comparison of corresponding accelerations of the vehicle associated with the images. Other telematics data may also include road usage statistics that is used for developing applications or services.

In some systems, the telematics information may include parameters recorded by the equipment 102a-n, including but not limited to, driver information, duty cycle information, equipment identification information, miles travelled, and miles travelled in geographic areas. In some systems, the telematics information may be sent to other applications, e.g., to determine one or more of traffic conditions, weather information, etc. In some systems, the telematics data is transmitted via the vehicle itself, and in other systems, transmitted by transceivers that convert signals and data to a form that can be transmitted to remote locations that receive and reconvert it into its original data format. In yet other systems, the system may convert the data from one form to another via a wireless connection to an in vehicle interface that renders icons that the user engages on a display. Alternate systems may interface Apple CarPlay® and Android Auto® that provide intuitive commands that minimize driver distractions. In some systems, a charging or taxation structure may utilize telematics data to derive charges/taxes specifically tailored to specific device types and distance utilization, e.g., accounting for differences in size and weight of the equipment 102a-n.

Figure 2:
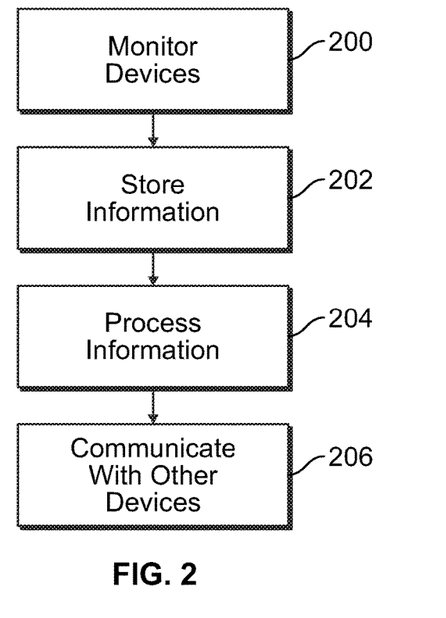
FIG. 2 is a flowchart of an example logic of the telematics device.

FIG. 2 is a flowchart of an example logic of the telematics device 114. The telematics device 114 may monitor information from one or more devices/systems of the equipment 102a-n, including but not limited to, the engine/motor 104, the sensors 110, the batteries 116 and the location device 117 (200). Further, it may process the data on-board the vehicle prior to a transmission. The telematics device 114 may also store, at least temporarily, information related to the monitoring, including, but not limited to, miles travelled, energy consumed, location information, e.g., location when consuming energy, etc. (202). The sensors 110 may include one or more wheel sensors that renders data processed to determine miles travelled, battery/fuel level sensors to determine energy consumed, voltage and/or current sensors to determine charge and rate information, etc. In some systems, the sensors 110 comprise optical sensors that may be part of an on-board camera that is a unitary part of the vehicle. Some systems integrate sensor data generated by an accelerometer or an on-board Doppler radar to capture video or images of conditions that precede and follow road risk events. For example, the sensors 110 (such as an on-board camera, for example) may begin capturing images near crash sites based on a sudden brake event, a steering event, or an acceleration event, for example, or based on-board Doppler radar that may detect the rate and direction of an approaching vehicle. The system may identify a potential risk condition, that in some instances, may result in assessing a charge. The charge may be assessed by a motor vehicle agency or department (i.e., government entity device 150). The sensors 110 may also trigger air bags deployment. Information from the sensors 110 may also be time stamped with timing indicia, e.g. of the telematics device 114, and/or location stamped to determine a time of location when the telematics device 114 received the information. Additionally or alternatively, distance travelled may be tracked by the location device 117, such as a GPS-based device or another device. In some examples, some or all of the tracked information is not stored by the telematics device 114 but directly passed along to other devices without storing the information.

In some systems, the telematics device 114 may process the telematics information and send processed information to one or more of the third party entity device 140, the government entity device 150 and/or the mobile device 160 (204). Additionally or alternatively, the telematics device 114 sends raw data to the third party entity device 140, the government device 150 and/or the mobile device 160 that is stored in memory 144, 154, 164 and/or processed by the servers 142, 152 or processor 162, to determine charge/tax related information for the equipment 102a-n. Additionally or alternatively, the memories 144, 154, 164 may store instructions, which when executed by the servers 142, 152 and/or processor 162 perform some or all of the logic described herein.

In some systems, the telematics device 114, or other processor of the equipment 102a-n, may determine the fuel source or levels consumed by the equipment 102a-n within a determined geo-fenced area, e.g., based on the current telematics information indicating a location of the equipment 102a-n. In some systems, the ECU 106, or another control module, the equipment 102a-n may restrict a use of one or more fuel sources (e.g., switching from fossil fuel source to electric power or hydrogen fuel cells, or a combination of both, for example) based on a detected location of the equipment 102a-n within a determined geo-fenced area. For example, for a hybrid vehicle, a state or municipality may require that electric power only be used in certain areas, while allowing gasoline or other non-electric power use in other areas. The ECU 106, or other control module of the equipment 102a-n may control the power source used by the equipment 102a-n based on information from the state or municipality. The information from the state or municipality may be stored on the equipment 102a-n and/or accessed by the equipment 102a-n, e.g., via the communication network/environment 130.

Additionally or alternatively, the telematics device 114 may send the raw or processed information including for example, images captured by one or more on-board cameras or data transmitted from other sources such as data provided by other vehicles or infrastructure, that renders alerts (such as Amber alerts) to a user device 160 for further in vehicle processioning, transmission to other sources, and/or use by in-vehicle displays. The images captured by the one or more on-board cameras may be used to match an "object of interest" such as a missing person, a suspect's vehicle along with "data of interest", such as time and location associated with the captured image. In some systems, the receipt of the alert may initiate an automatic detection condition which may trigger a positive result, which is then transmitted via telematics device to the third party entity device 140. The transmission may be a singular event, or may be repeated events with regular updates for a defined period of time. In these conditions, sensors which may be automatically initiated may be a camera and other sensors to automatically capture their surroundings when the alert for an emergency alert public announcement may be received by a driver or by a vehicle operator.

In some systems, the telematics device 114 communicates some of the raw and/or processed data to one or more of the third party entity device 140, the government entity device 150, and the mobile device 160, e.g., that process the information to charge and/or determine charges/taxes, as described in more detail below (206). For example, the third party entity device 140 may determine charges/taxes based on received raw and/or processed telematics information, and send the determined charges/taxes to the government entity device 150 for charging the owner and/or user, in some instances based on the equipment 102a-n. Additionally or alternatively, the raw and/or processed telematics information is sent directly to the government entity device 150 for processing and/or charging organizational charges/taxes. Additionally or alternatively, the processed telematics information is processed on-board the vehicle prior to being transmitted to another source. In some use cases, the source may comprise a government entity device 150 for assessing and/or charging organizational charges/taxes.

In some systems, the telematics device 114 may associate vehicle owner, driver, and/or passenger information, vehicle identification information, e.g., vehicle identification number (VIN) and vehicle description, or other information to identify the equipment, e.g., serial numbers, with the monitored/determined telematics information. The telematics information includes but is not limited to, miles travelled, energy consumption rates or energy consumed, location of charge information, other charging details, e.g., amount of charge, etc., The information may be sent to the third party entity 140, the government entity 150 and/or the mobile device 160, etc. The devices 140, 150, 106 may receive vehicle identifications and other information directly and/or indirectly from the telematics device 114, and associate the received information with individual owners and/or drivers of the equipment 102a-n. The telematics device 114 and/or the device 140, 150, 160 may associate a credit card, debit card bank account, or through other intermediary payment methods such as Paypal®, Apple Pay®, that may transmit telematics data for tax purposes through wireless or wired mobile connections such as Bluetooth, optical or USB (Universal Serial Bus) using applications such as Apple Car Play® and/or Android Auto®. The devices 140, 150, 160 may charge the individual based on the received information for charges including, but not limited to, usage charges, parking violations, moving violations, equipment violations, state and/or federal taxes, autonomous self-driving car usage and/or car sharing charges, etc. In some systems, the equipment 102a-n may include readers for credit card chips used to process payment in autonomous or other vehicles. In some fully or partially autonomous applications, vehicle telematics information is received via a vehicle to infrastructure (V2I) and used for reporting. For example, driving distance may be reported.

Figure 3:
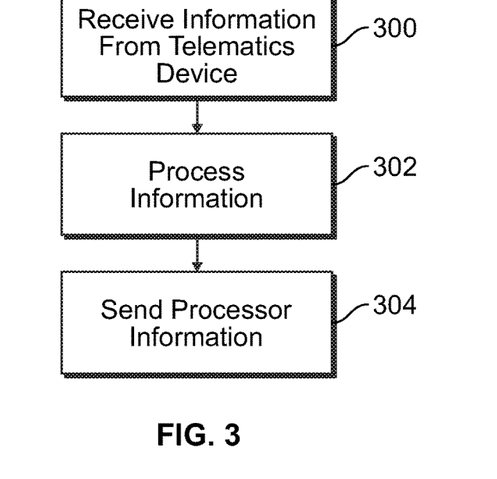
FIG. 3 is a flowchart of an example logic of the third party entity device and/or government device.

FIG. 3 is a flowchart of an example logic of the third party entity device 104, the government entity device 150 and/or the mobile device 160. The third party entity device 104, the government entity device 150 and/or the mobile device 160 may receive raw and/or processed telematics information from the telematics device 114 (300). Received information may include, but is not limited to, miles travelled, location, miles/time within geo-fenced area, energy usage, size of the equipment 102a-n, etc. For example, the third party entity device 104, the government entity device 150 and/or the mobile device 160 may process the received information to determine usage charges and/or taxes (302). In some examples, the vehicle telematics information further includes information on a duration that the equipment 102a-n spends in determined geo-fenced locations, e.g., within determined state lines, on specified highways, crossing determined bridges, etc. In this way, the telematics device 114 may eliminate the need for a user to separately track when/where the equipment 102a-n is being used and/or consuming energy. In some systems, federal charges are based on time of usage or miles travelled multiplied by a multiplier based on the type of equipment 102a-n and/or by a factor, e.g., the federal tax rate. In some systems, state charges are be based on time of usage or miles travelled within the state and the type of equipment 102a-n multiplied by a multiplier based on the type of equipment 102a-n and/or by a factor, e.g., the state tax rate. In some systems, municipal charges are be based on time of usage or miles travelled within the municipality and the type of equipment 102a-n multiplied by a multiplier based on the type of equipment 102a-n and/or by a factor, e.g., the municipal tax rate.

The telematics device 114 provides the processed information to third party entity devices 104, government entity devices 150 and/or mobile devices 160 (304). In some systems, the telematics device 114 sends raw telematics related data to the servers 142, 152 and/or processor 162 to process the information. The telematics device 114 may vary data sampling rates and/or compress the raw and/or processed data, e.g., including the vehicle telematics information, before storing the data and/or sending the data to the devices 140, 150, 160. In this way, the determined sampled and/or compressed data may be optimized for processing and/or storage based on determined algorithms. The sampled and/or compressed data may minimize cost of data transmission, e.g., to cloud storage and/or processing services, to the entity devices and/or other remote data locations. In this way, the environment 100 for tracking information related to usage and/or tax charges may automatically handle tracking and charging at the equipment level, e.g., without the need for third party applications. In some systems, the servers 142, 152 and/or processor 162 may then charge back to an account of the equipment user and/or owner for payment and other interactions.

Figure 4:
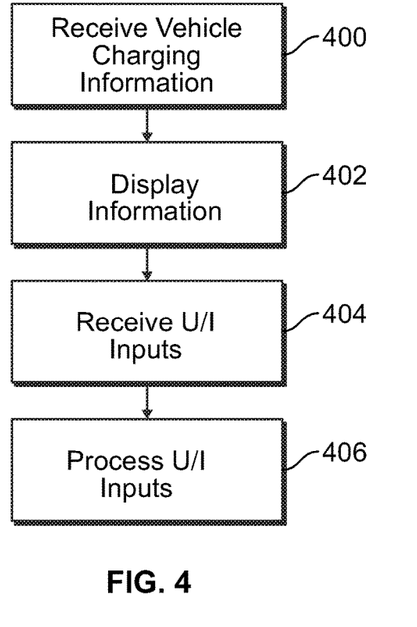
FIG. 4 is a flowchart of an example logic of the user device.

FIG. 4 is a flowchart of an example logic of the user device 160. The user device 160 may receive vehicle telematics information tracked by the telematics device 114 and/or processed by the telematics device 114, third party entity device 104, the government entity device 150 and/or the mobile device 160 (400). The user device 160 may display the information to the user, e.g., on display 168 via web browser 166 (402). In other applications, the user device 160 displays the information via a web portal or a standalone application. The user device 160 may receive user inputs via the U/I 170 based on the displayed information (404). For example, the user device 160 may process the user inputs, e.g., to pay usage fees and/or taxes via the web browser 166 (406).

Figure 5:
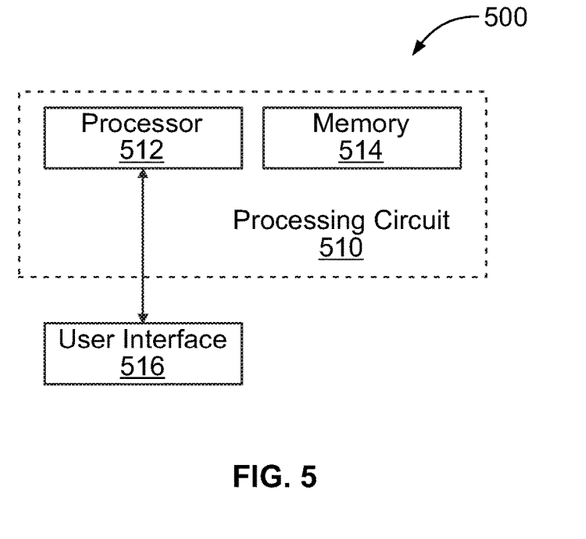
FIG. 5 is a block diagram of an example computing device.

FIG. 5 is a block diagram of an example circuitry, e.g., for one or more of the ECU 106, servers 142, 152, and/or the mobile device 160. The ECU 106, servers 142, 152, and/or the mobile device 160 may include a processing circuit 510 which includes a processor 512 to process the information tracked by the telematics device 114. The processing circuit 510 may include hardware, software and/or firmware, or any combination thereof. The hardware may include electronic components on a printed circuit board, ceramic substrate or a thin laminate substrate, etc. Software may be stored in a memory 514, e.g., erasable, programmable read only memory (EPROMs) or flash memory, so the processor 512 may be re-programmed by uploading updated code, over-the-air (OTA) updates, or replacing chips. It will be appreciated that the components, devices or elements illustrated in and described with respect to FIG. 5 may not be mandatory and thus some may be omitted in certain examples. Additionally, some examples may include further or different components, devices or elements beyond those illustrated in and described with respect to FIG. 5.

In some systems, the processing circuitry 510 is configurable to perform actions in accordance with one or more examples disclosed herein. In this regard, the processing circuitry 510 may be configured to process tracked vehicle telematics information. The processing circuitry 510 may be configured to perform data processing, application execution and/or other processing and management services according to one or more examples. In some examples, the processing circuitry 510 or a portion(s) or component(s) thereof, may include one or more chipsets and/or other components that may be provided by integrated circuits.

The processor 512 may be embodied in a variety of forms. For example, the processor 512 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 may comprise a plurality of processors. The plurality of processors may be in operative communication with each other and may be collectively configured to perform one or more functionalities of the ECU 106, servers 142, 152, fleet manager devices 120 and/or the mobile device 160 as described herein. In some systems, the processor 512 may be configured to execute instructions that may be stored in the memory 514 or that may be otherwise accessible to the processor 512. As such, whether configured by hardware or by a combination of hardware and software, the processor 512 is capable of performing operations according to various examples while configured accordingly.

In some systems, the memory 514 may include one or more memory devices. Memory 514 may include fixed and/or removable memory devices. In some systems, the memory 514 may provide a non-transitory computer-readable storage medium that may store computer program instructions that may be executed by the processor 512. In this regard, the memory 514 may be configured to store information, data, applications, instructions and/or the like for enabling the ECU 106, servers 142, 152, fleet manager devices 120 and/or the mobile device 160 to carry out various functions in accordance with one or more examples. In some systems, the memory 514 may be in communication with one or more of the processor 512, the user interface 516 for passing information among components of the ECU 106, servers 142, 152, fleet manager devices 120 and/or the mobile device 160.

Figure 6:
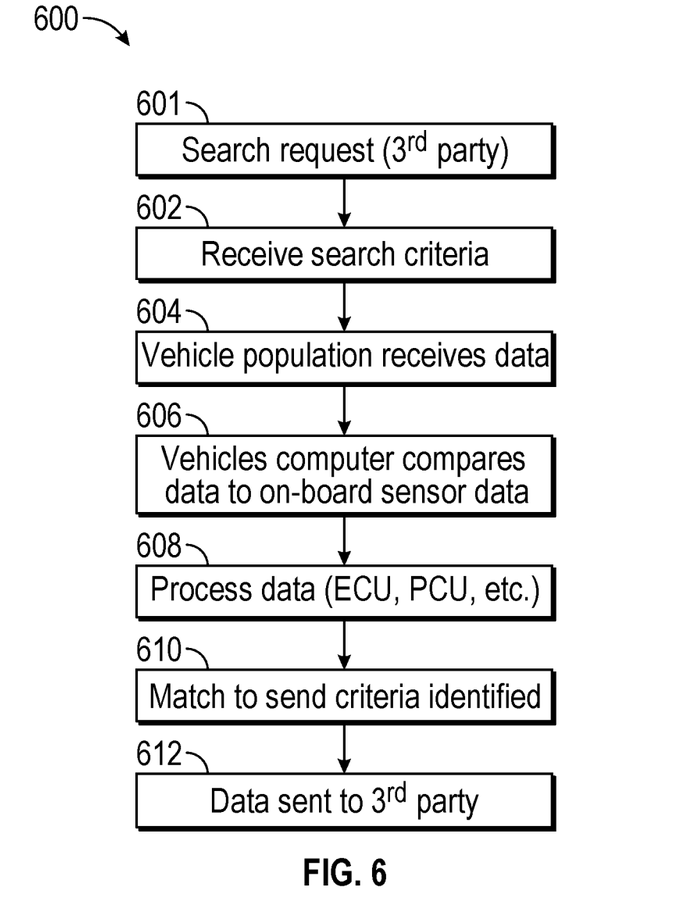
FIG. 6 is an exemplary process of a vehicle receiving and communicating back an alert announcement.

FIG. 6 is an exemplary process 600, which a vehicle (or interchangeably may called "equipment" hereinafter) may receive and communicate back an alert announcement to an initiator of the alert announcement. In step 601, one or more drivers in the vehicles may receive a search request (e.g., an alert announcement) from a third party. The third party may be from a local law enforcement department, a state authority such as Department of Motor Vehicle (DMV), Department of Transportation (DOT), Emergency Services (EMS), Federal Bureau of Investigation (FBI) or National Security Agency (NSA), etc. In another embodiment, the search criteria data may be sent out by an intermediary of the third party, such as a telematics provider, as shown in step 602. In step 604, a plurality of vehicles may process the search criteria or data in the alert announcement sent out by the third party or by the intermediary. In step 606, respective vehicles may each compare the received search criteria data of the alert announcement with the vehicles' on-board sensor data. The on-board sensors may be a Light Imaging Detection and Ranging (LIDAR) sensor which uses laser pulses and sound waves to detect objects to determine their size as well as their exact disposition to form a three-dimensional (3D) image. In step 608, a plurality of on-board computers (e.g., engine control unit (ECU) or powertrain control unit (PCU)) of the vehicle may process and compare the search criteria or data in the alert announcement with the detected data by the on-board sensors. In step 610, when a match is found, a match alert message may be triggered by the on-board computers. In step 612, the vehicle may send back the match alert message to the third party.

Figure 7:
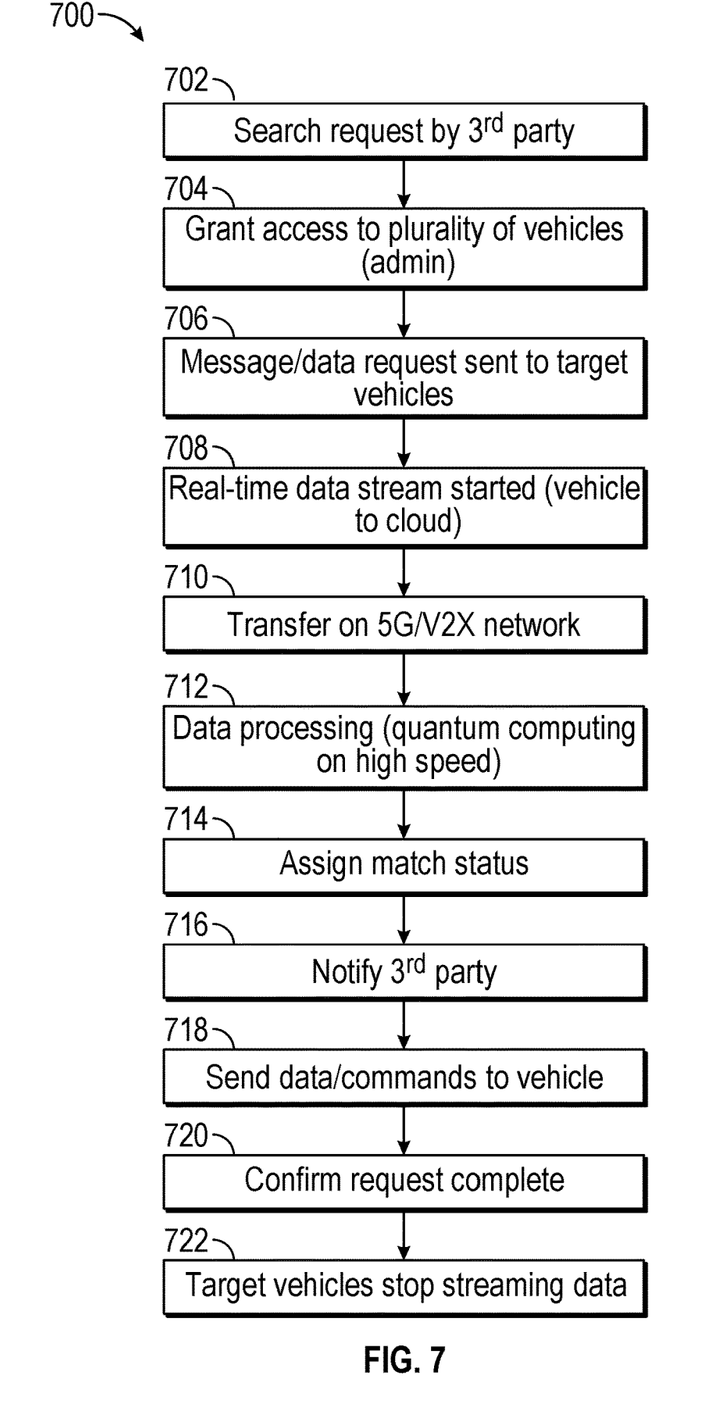
FIG. 7 is an exemplary process 700 of a third party communicating data with a vehicle in real-time.

FIG. 7 is an exemplary process 700 of a third party communicating data a vehicle in real-time, which are remotely processed. FIG. 7 is similar to FIG. 6 in some aspects but with other details from another perspective. In step 702, the third party may send the alert announcement with search criteria to an access grantor for approval prior to sending to the vehicles on the road for a search. In step 704, vehicles' access to the search criteria data in the alert announcement may be granted by the access grantor of the third party, such as a telematics provider, as shown in step 704. In step 706, the alert announcement prompts the vehicles to send relevant data according to the search request criteria. In step 708, the plurality of vehicles that received and accepted the search request may start to transmit relevant data matching the search criteria to a centralized source, such as to a cloud storage or to a remote database. In an embodiment, relevant data from a plurality of vehicles may be transmitted through a high speed low latency network (such as a fifth generation vehicle to everything 5G/V2X network) as shown in step 710. In step 712, a high speed computing system (such as quantum computers) may process and analyze in real-time, the received data transmitted by the plurality of vehicles. In step 714, an alert message is sent to the third party, when the high speed computing system determines that there is one or more matches found among the received data transmitted by the plurality of vehicles. In step 716, the third party may be notified by the high speed computing system that pertinent information (e.g., location, time, speed), from at least one vehicle, were found from the matched data. In step 718, commands may be sent directly by the third party or through the intermediary, to the at least one vehicle that provided the matched data for the alert announcement. In step 720, a confirmation is received from the at least one vehicle that provided the matched data for the alert announcement, that the search request has been completed. In step 722, the plurality of vehicles may receive an alert announcement of that the request for search is no longer necessary and no further data would be accepted.

Figure 8:
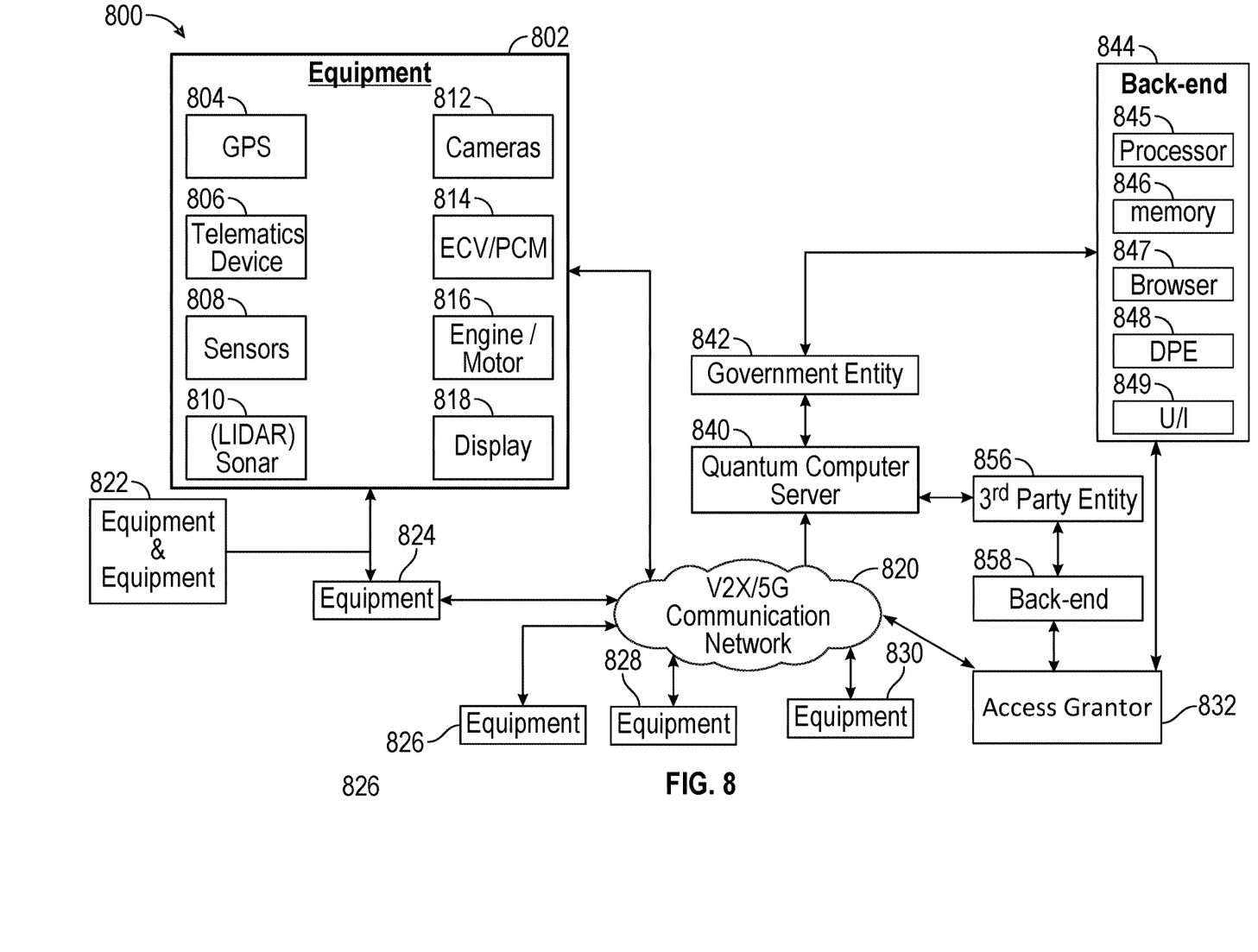
FIG. 8 is an exemplary system block diagram illustrating communicating telematics data to and from a vehicle through a network.

FIG. 8 is an exemplary system block diagram 800 illustrating communicating telematics data to and from a vehicle through a network (820). Vehicle or equipment 802 may include a GPS receiver 804, a telematics device 806, a plurality of on-board sensors 808, a LIDAR and sonar device 810, a plurality of o-board cameras 812, an engine control module (ECV) and powertrain control module (PCM) 814, a vehicle engine 816, and a display 818.

The GPS receiver 804 receives GPS satellite signals to provide positioning data and vehicle navigation information. The telematics device 806 receives telematics data from a plurality of sensors 808 in the vehicle and communicate the received telematics data to one or more remote devices or to a third party entity. The plurality of on-board sensors 808 may include sensors which collect telematics data of the vehicle as described, and sensors which may sense the vehicle's surrounding and interactions with other vehicles, objects or pedestrians for safety conditions. The LIDAR and sonar device 810 uses laser pulses and sound waves to detect objects to determine their size as well as exact disposition to form a three-dimensional (3D) image, which may be particularly useful in advanced driving assistance systems (ADAS), such as the autonomous self-driving vehicles. The plurality of on-board cameras 812 (for imaging of both visible and non-visible spectrum) may monitor and constantly taking image data in conjunction with the functions of LIDAR and sonar device 810 to provide data for the ADAS. The on-board computers (e.g., engine control module (ECV) and powertrain control module (PCM) 814) may perform on-board computing using the received telematics data.

The engine motor 816 may send configuration information on the performance of the motor engine. The display 818 may display the road conditions, a received public alert announcements and received telematics data. The vehicle's communication may be serviced by a low latency high speed network 820, such as the fifth generation vehicle to everything network (5G/V2X network) which is capable of supporting autonomous driving which would require a high speed and high bandwidth network that can send and receive a vast amount of data. FIG. 8 illustrates that the 5G/V2X network 820 is capable of simultaneously supporting communications to other equipment 822 to 830, and between the equipment on the road. In an example, the 5G/V2X network 820 may be serviced by a centralized high speed server, such as a quantum computer server 840. The government entity 842 may be a local law enforcement department, a state government entity of DMV, or a federal government entity, such as the DOT, the FBI or the NSA as previously mentioned, which may be serviced by one or more backend server 844 with a database, including at least a processor 845, a memory 846 which stores a plurality of application and programs 848, hosting a browser 847 and a user interface 849. Blocks 856 and 858 represents a third party which have an interest in the telematics data and the requested data from the alert announcement returned by the equipment 802, 822-830.

It is noted that the terms "substantially" and "about" may be utilized herein to represent an inherent degree of uncertainty that may be attributed to any quantitative comparison, value, measurement, or other representation and in other systems within about ten percent. These terms are also utilized herein to represent a degree by which a quantitative representation may vary from a stated reference without resulting in a change in the basic function of the subject matter at issue. While particular examples above have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

We claim:

1. A system for tracking local information of an equipment on a vehicle, comprising:
    a telematics device in the vehicle configured to receive at variable data sampling rate, raw data of vehicle telematics information comprising two or more of: energy usage, rate of energy consumption, equipment type, vehicle owner's information, a vehicle location, a duration of vehicle in the location, parking and moving violation, vehicle fines, distance travelled on the vehicle, and weight and size of equipment; and
    a transmission device configured to compress the raw data of the vehicle telematics information and directly transmit through a network, the compressed raw data of the vehicle telematics information to at least one of a third party entity device, a government device and a mobile device to determine a usage charge based on the vehicle telematics information, and wherein the telematics device is configured to receive one or a combination of: public emergency alert announcement, captured images and associated data for matching to an object of interest in the public emergency alert announcement, optical sensors data, on-board laser and sonar pulsed sensor and imaging camera data to render the captured images and associated data for remote analysis by the at least one of the third party entity device, the government device and the mobile device.

2. The system of claim 1, wherein the energy usage comprises total energy consumed by one or a combination of battery electric power, hydrogen fuel, natural gas, diesel fuel, solar power and gasoline, and the rate of energy consumption comprises per unit time measurement of one or a combination of battery electric power, hydrogen fuel, natural gas, diesel fuel, solar power and gasoline.

3. The system of claim 1, wherein the vehicle comprises one of: transportation vehicles, recreation vehicles, industrial or home equipment, autonomous vehicles, flying vehicles.

4. The system of claim 3, wherein the transportation vehicles comprise anyone of: a hybrid vehicle, an electric powered vehicle, a rental or a leased vehicle, a fleet managed vehicle, a car, a bus, a truck, wherein the recreation vehicles comprise anyone of: an all-terrain vehicle (ATV), an off-road vehicle, a drone, a boat, and the industrial/home equipment comprise anyone of: a power generator, a mining equipment, an agriculture equipment, a construction equipment.

5. The system of claim 3, wherein for autonomous self-driving vehicles, vehicle telematics information may be communicated to an infrastructure network communication on distance driven in autonomous mode to levy a usage tax on vehicle to infrastructure; and for flying cars, a flight tax may be levied per trip and based on amount of fuel consumed and distance flown.

6. The system of claim 1, wherein the telematics device, the government device and the mobile device associates a credit card, a debit card bank account, or through connection with a mobile device.

7. The system of claim 1, wherein the government device charges vehicle owner based on received vehicle telematics information, comprising: usage charges, parking metering, moving violations, vehicle fines, state lines, specified highways, crossing determined bridges and car sharing charges.

8. The system of claim 1, where the vehicle telematics information further includes information of a duration the equipment spends in determined geo-fenced locations.

9. The system of claim 8, further including an electronic control unit configured to restrict a use of a fuel source or switch to an alternate fuel source based on a determined geo-fenced area.

10. A method for tracking local information of an equipment in a vehicle, comprising:
receiving by a server, compressed raw data of vehicle telematics information which are compressed before being transmitted from a transmission device of a vehicle, the raw data of vehicle telematics information indicates energy and equipment use in the vehicle over a period of time, wherein the raw data of vehicle telematics information are received at variable data sampling rate by a telematics device, and the raw data of vehicle telematics information includes two or more of: energy usage, rate of energy consumption, equipment type, vehicle owner's information, a vehicle location, a duration of vehicle in the location, parking and moving violation, vehicle fines, distance travelled on the vehicle, and weight and size of equipment; and
processing the raw data of the vehicle telematics information to determine a usage charge or a tax; and
directly transmitting through a network, the usage charge or the tax to at least one of a third party entity device, a government device and a mobile device in order to determine a usage charge based on the vehicle telematics information, and wherein the telematics device is configured to receive one or a combination of: public emergency alert announcement, captured images and associated data for matching to an object of interest in the public emergency alert announcement, optical sensors data, on-board laser and sonar pulsed sensor and imaging camera data to render the captured images and associated data for remote analysis by the at least one of the third party entity device, the government device and the mobile device.

11. The method of claim 10, wherein the energy usage comprises total energy consumed by one or a combination of battery electric power, hydrogen fuel, natural gas, diesel fuel, solar power and gasoline, and the rate of energy consumption comprises per unit time measurement of one or a combination of battery electric power, hydrogen fuel, natural gas, diesel fuel, solar power and gasoline.

12. The method of claim 10, wherein the vehicle comprises one of: transportation vehicles, recreation vehicles, industrial or home equipment, autonomous vehicles, flying vehicles.

13. The method of claim 12, wherein the transportation vehicles comprise anyone of: a hybrid vehicle, an electric powered vehicle, a rental or a leased vehicle, a fleet managed vehicle, a car, a bus, a truck, wherein the recreation vehicles comprise anyone of: an all-terrain vehicle (ATV), an off-road vehicle, a drone, a boat, and the industrial/home equipment comprise anyone of: a power generator, a mining equipment, an agriculture equipment, a construction equipment.

14. The method of claim 12, wherein for autonomous self-driving vehicles, vehicle telematics information may be communicated to an infrastructure network communication on distance driven in autonomous mode to levy a usage tax on vehicle to infrastructure; and for flying cars, a flight tax may be levied per trip and based on amount of fuel consumed and distance flown.

15. The method of claim 10, wherein the telematics device, the government device and the mobile device associates a credit card, a debit card bank account, or through connection with a mobile device.

16. The method of claim 10, wherein the government device charges vehicle owner based on received vehicle telematics information, comprising: usage charges, parking metering, moving violations, vehicle fines, state or federal taxes, state lines, specified highways, crossing determined bridges and car sharing charges.

17. The method of claim 10, where the telematics information further includes information of a duration the equipment spends in determined geo-fenced locations.

18. The method of claim 10, further comprising restricting by an electronic control unit, a use of the fuel source or switching to an alternate fuel source based on a determined geo-fenced area.

* * * * *